Aug. 9, 1932.  A. F. MASURY  1,871,331
BUMPER
Filed April 4, 1931  2 Sheets-Sheet 1

INVENTOR
Alfred F. Masury,
BY
Redding, Greeley, O'Shea & Campbell
HIS ATTORNEYS

Aug. 9, 1932.   A. F. MASURY   1,871,331
BUMPER
Filed April 4, 1931   2 Sheets-Sheet 2
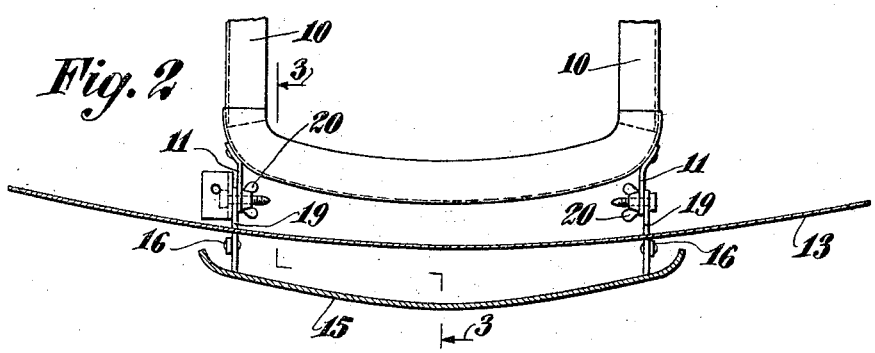
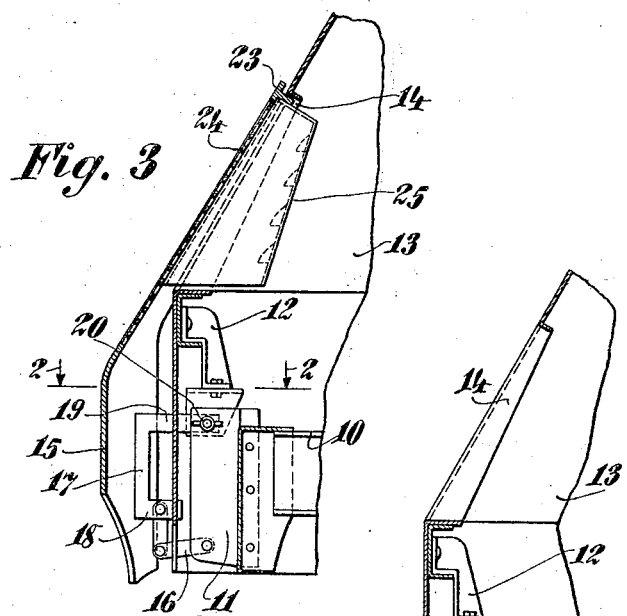
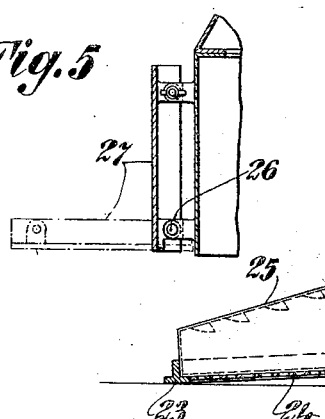
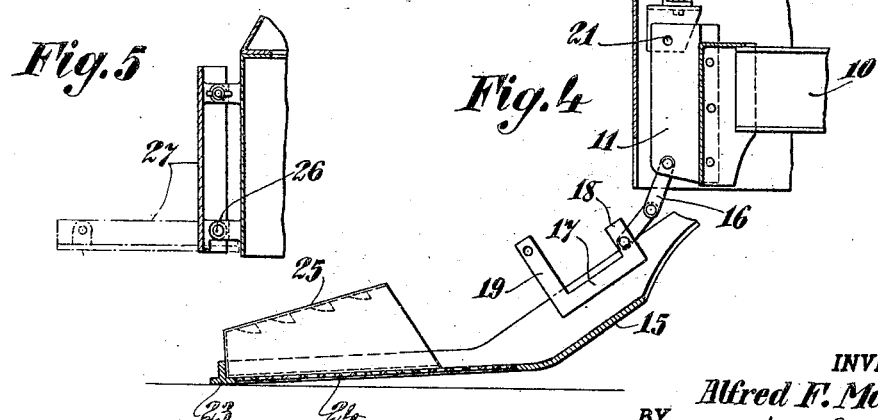
INVENTOR
Alfred F. Masury,
BY
Redding, Greeley, O'Shea & Campbell
HIS ATTORNEYS Patented Aug. 9, 1932

1,871,331

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

BUMPER

Application filed April 4, 1931. Serial No. 527,707.

The present invention relates to bumper attachments for motor vehicles and embodies, more specifically, an improved bumper construction by means of which the bumper is mounted to facilitate inspection of the engine and front portion of the vehicle rearwardly of the bumper. More particularly, the invention relates to a bumper which is hingedly connected to the vehicle at one point and is adapted to be secured normally in an upright position, the securing means enabling the bumper to be swung downwardly about its hinge in order that access may be had to the portion of the vehicle rearwardly of the bumper.

An object of the invention accordingly is to provide a bumper which is adapted to be mounted in such fashion that it may serve, effectively, in its capacity as a protective device, at the same time facilitating the movement of the bumper to a position wherein access may be had to portions of the vehicle rearwardly thereof without entirely disconnecting the same from the vehicle.

A further object of the invention is to provide a bumper of the above character, wherein a grating or other screen effect is incorporated to simulate the usual honeycomb or guard device which is used forwardly of the radiator or other device through which cooling air is drawn.

A further object of the invention is to incorporate with a device of the above character, an improved mounting device for bumpers and the like, wherein movement of the bumper to, and securing the same in a desired position is greatly facilitated.

Further objects, not specifically enumerated above, will be apparent as the invention is described in greater detail in connection with the accompanying drawings, wherein:

Figure 2 is a view in section, taken on the plane indicated by the line 2—2 of Figure 3, and looking in the direction of the arrows.

Figure 3 is a view in section, taken on line 3—3 of Figure 2, and looking in the direction of the arrows.

Figure 4 is a view similar to Figure 3, showing the bumper moved to a position, wherein convenient access is afforded to the elements on the vehicle frame rearwardly of the bumper.

Figure 5 is a view similar to Figure 3 showing a modified construction, wherein the bumper is mounted in such fashion as to enable the same to serve as a step, the position of the bumper when so used being indicated in dot and dash lines.

Figure 1:
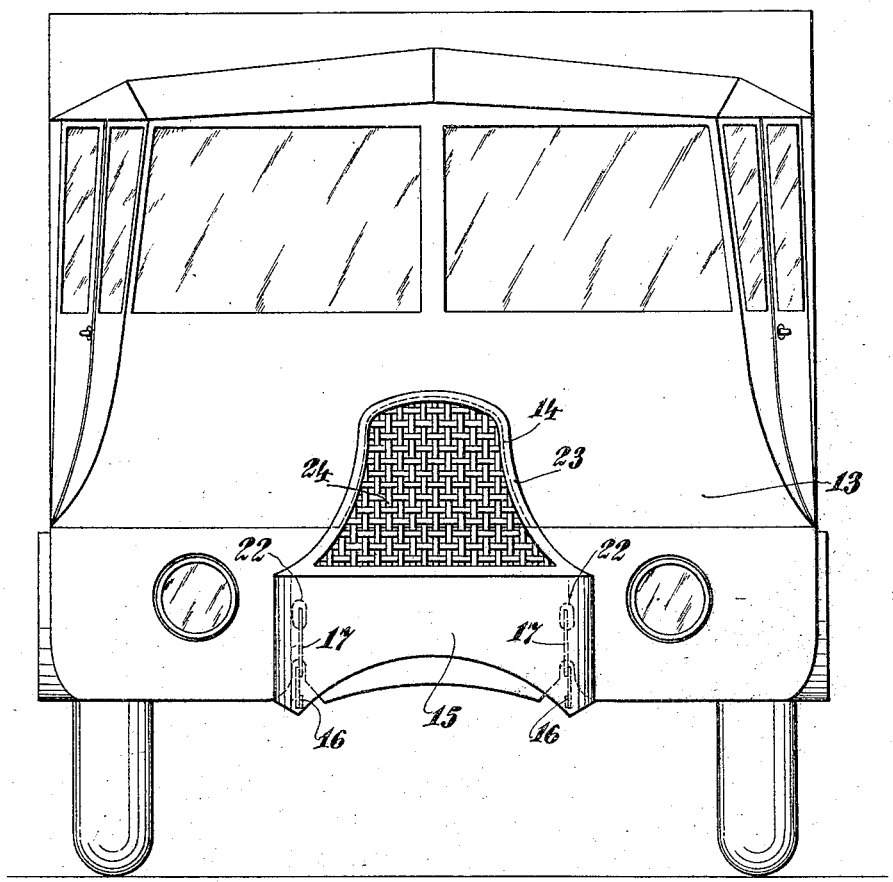
Figure 1 is a view in front elevation, showing a vehicle equipped with a bumper constructed in accordance with the present invention.

Referring specifically to Figures 1, 2, 3, and 4 a vehicle frame is indicated at 10 upon which webs 11 are mounted at opposite sides thereof, these webs carrying brackets 12 upon which a hood or cab structure 13 may be mounted. The hood or cab may be formed with an aperture 14 for a purpose to be described hereinafter and a bumper 15 is carried by the web 11 through links 16. L-shaped brackets 17 are secured to the bumper 15 and the lower arms 18 thereof are pivoted to the links 16, as clearly shown in Figures 3 and 4. The upper arms 19 of the brackets 17 are adapted to be secured to the webs 11 by means of wing nuts 20 which pass through apertures 21 in the webs 11 and also secure brackets 12 thereto. Suitable apertures 22 are formed in the hood or cab 13 to permit arms 19 to extend therethrough and be secured to the webs 11.

Above the bumper and integral therewith is a guard 23 carrying a grating 24 or other protective device. Rearwardly of the guard 23, a wall 25 is secured, this wall being opened at the bottom to permit air to flow through the guard and be deflected downwardly adjacent the portions of the chassis to be cooled. The wall 25 is received within the opening 14 in the hood and thus may be conveniently removed with the guard 23 and bumper 15, in order that the forward portion of the chassis may be conveniently inspected. If it is desired to remove the hood or cab 13, the wing nuts 20 are removed and the bumper dropped to the position shown in Figure 4. The hood or cab may then be conveniently moved to a more convenient position for providing access to the engine and the elements may likewise be conveniently restored to the normal position shown in Figure 3.

With reference to Figure 5, the bumper is hinged about a fixed axis at 26 and is adapted to be moved to a substantially horizontal position indicated at 27 in dot and dash lines in order that it may serve as a step. The lower portion of the bumper is so designed as to serve as a stop to limit the pivotal movement of the bumper from a vertical to a horizontal position.

While the invention has been described with specific reference to the accompanying drawings, it is not to be limited, save as defined in the appended claims.

I claim as my invention:

1. In combination with a bumper and means to mount the same on a vehicle, a guard secured thereto and extending upwardly therefrom, said guard having a grating and a wall secured rearwardly thereof to direct the flow of air through the guard.

2. In combination with a bumper and means to mount the same in a vehicle, a hood carried by the vehicle and having an aperture, and a guard secured to the bumper and extending upwardly therefrom and having a grating and a wall rearwardly thereof received within the aperture to direct the flow of air through the guard.

This specification signed this 2d day of April A. D. 1931.

ALFRED F. MASURY.